US009001153B2

United States Patent
Green et al.

(10) Patent No.: US 9,001,153 B2
(45) Date of Patent: Apr. 7, 2015

(54) SYSTEM AND APPARATUS FOR AUGMENTED REALITY DISPLAY AND CONTROLS

(75) Inventors: Charles A. Green, Canton, MI (US); Jeremy A. Salinger, Southfield, MI (US); Guy Raz, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 13/425,642

(22) Filed: Mar. 21, 2012

(65) Prior Publication Data

US 2013/0249942 A1    Sep. 26, 2013

(51) Int. Cl.
*G09G 5/00* (2006.01)
*G06F 3/14* (2006.01)

(52) U.S. Cl.
CPC ........................................ *G06F 3/14* (2013.01)

(58) Field of Classification Search
None
See application file for complete search history.

(56) References Cited

U.S. PATENT DOCUMENTS

| | | | | |
|---|---|---|---|---|
| 2009/0132097 | A1* | 5/2009 | Sharma et al. | 700/300 |
| 2010/0070907 | A1* | 3/2010 | Harrod et al. | 715/772 |
| 2010/0304640 | A1* | 12/2010 | Sofman et al. | 446/456 |
| 2011/0257930 | A1* | 10/2011 | Gourraud | 702/150 |
| 2012/0056896 | A1* | 3/2012 | Border | 345/592 |
| 2012/0127284 | A1* | 5/2012 | Bar-Zeev et al. | 348/53 |
| 2012/0229508 | A1* | 9/2012 | Wigdor et al. | 345/633 |
| 2013/0042296 | A1* | 2/2013 | Hastings et al. | 726/1 |
| 2013/0070204 | A1* | 3/2013 | Johansson et al. | 351/224 |
| 2013/0194228 | A1* | 8/2013 | Tuzar | 345/174 |
| 2013/0194389 | A1* | 8/2013 | Vaught et al. | 348/47 |

OTHER PUBLICATIONS

Augmented reality HDM second device—Google Scholar.*

* cited by examiner

*Primary Examiner* — David Zarka
*Assistant Examiner* — Khoa Vu

(57) ABSTRACT

An augmented reality system includes a vision output device for displaying virtual images. A sensing device captures an image within a reference frame. The vision output device is captured within the image. A processing unit identifies the vision output device within the reference frame of the captured image and localizes the vision output device within the reference frame of the captured image for identifying an absolute position and orientation of the vision output device within the reference frame of the captured image. The vision output device generates virtual displays to a user at respective locations based on the absolute position and orientation of the vision output device within reference frame of the captured image. The sensing device captures a user's selection of a virtual control. The processing unit identifies the selection of the virtual control within the captured image and enables a control action of a controllable device.

20 Claims, 2 Drawing Sheets

SYSTEM AND APPARATUS FOR AUGMENTED REALITY DISPLAY AND CONTROLS

BACKGROUND OF INVENTION

An embodiment relates generally to virtual controls and displays.

Virtual systems utilize goggles for displaying virtual elements. The goggles display virtual elements for executing information or controls used in video games, tourist information, movies, etc. Such systems are typically course in regards to the position of the virtual elements that are displayed. That is, because of the positioning error, the location of the virtual elements can only be displayed with a certain amount of accuracy. As a result, some virtual systems may not be feasible for utilizing virtual displays or control where it is essential that an accurate positioning of the virtual displays are required and it is difficult locating the spectacles in free space.

SUMMARY OF INVENTION

An advantage of an embodiment is a determination of an absolute position and orientation of the spectacles within a reference frame of a captured image that are worn by a user for generating virtual displays. The absolute position of the spectacles within the reference frame of the captured image allows the augmented reality system to generate virtual displays of information and virtual controls at precise locations and to accurately identify a selection of virtual controls by the user. Moreover, by utilizing a navigation system in cooperation with the determined position and orientation of the spectacles within the reference frame of the captured image, virtual displays may be generated by the spectacles relative to objects outside of the captured image with increased accuracy. As a result, displays and control information can be accurately displayed within the captured image and exterior of the captured image with accuracy. The virtual displays may relate to any types of controllable devices that include, but are not limited to, vehicle devices and functions, vehicle accessories, smartphone applications, personal digital assistant applications, and navigation. The spectacles alleviate packaging concerns for applications that use conventional heads-up-displays.

An embodiment contemplates an augmented reality system. A vision output device displays virtual images that include virtually displayed information and virtual controls associated with controllable devices. A sensing device captures an image within a reference frame. The vision output device is captured within the image. A processing unit is coupled to the sensing device for identifying the vision output device within the reference frame of the captured image. The processing unit localizes the vision output device within the reference frame of the captured image for identifying an absolute position and orientation of the vision output device within the reference frame of the captured image. The vision output device generates virtual displays to a user utilizing the vision output device at respective locations based on the absolute position and orientation of the vision output device within reference frame of the captured image. The sensing device captures a user's selection of a virtual control. The processing unit identifies the selection of the virtual control within the captured image and enables a control action of a controllable device associated with the selected virtual control.

An embodiment contemplates a method of displaying augmented reality images relative to a reference frame of a captured image. An image capture device captures an image of a vision output device within the reference frame of the captured image. A processing unit detects absolute position and orientation of the vision output device within the reference frame of the captured image. The vision output device generates virtual displays to a user of the vision output device at respective locations based on the absolute position and orientation of the vision output device within the reference frame of the captured image. The virtual displays include information and virtual controls associated with controllable devices. The image capture device captures a user's selection of a virtual control. The processing unit identifies the selection of the virtual control and enables a control action for a controllable device associated with the selected virtual control.

DETAILED DESCRIPTION

Figure 1:
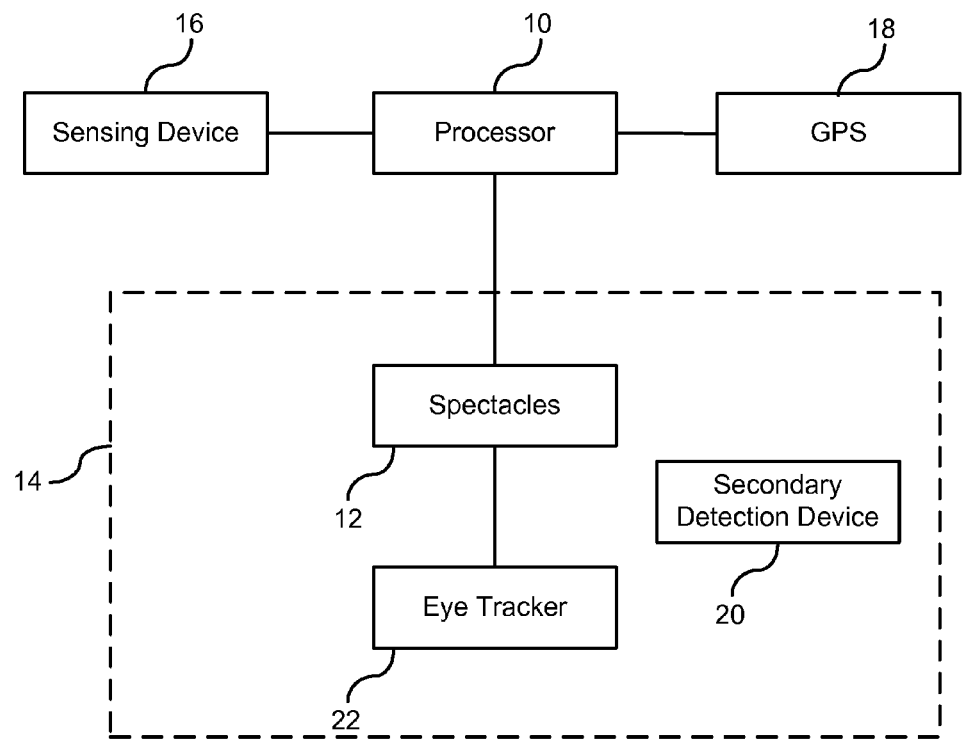
FIG. 1 is a block diagram of the augmented reality system.

There is shown in FIG. 1 an augmented reality system. The augmented reality system includes an augmented reality processing unit 10 and an augmented reality vision device such as spectacles 12. The spectacles 12 are disposed within a reference frame 14 of the captured image for localizing the spectacles 12 within the captured image.

The reference frame 14 of the captured space is a known space for which a coordinate system or set of axes may be applied to an image captured in the space to measure the position, orientation, and other properties of spectacles or other objects within the reference frame of the captured image. Moreover, the reference frame 14 of the captured image may also include an observational reference frame where the state of motion of an object is identified and tracked. The reference space 14 may include an interior passenger compartment of a vehicle or other known space where the position of the spectacles 12 can be identified with accuracy by a coordinate system. The embodiments illustrated herein are described in terms of vehicle systems; however, it should be understood that the system is not restricted to vehicles but may apply to any environment where the spectacles can be located within a respective space.

The spectacles 12 are used to provide a virtual display of information and a display of virtual controls of various vehicle applications to the person (e.g., driver) wearing the spectacles 12. The spectacles 12 are transparent for viewing real-life occurrences within and outside of the vehicle. Virtual controls are defined as any type of control action asserted by the user associated with a virtual display and is identified by the processing unit 10 in the augmented reality environment for modifying a controllable device. A controllable device is defined as any device or application (e.g., electrical, mechanical, computing, etc.,) in which the user is operating. Such devices may include vehicle-based or non-vehicle based devices or applications. Examples of such devices that are vehicle-based include, but are not limited to, the radio, heater, wipers, phone, portable media player, computer, navigation unit, and security systems. In addition, applications may include software-based applications. Virtual information and virtual controls displayed to the driver by the spectacles 12 include, but are not limited to, vehicle operating conditions and data, vehicle controls (e.g., radio/entertainment, HVAC, window operation, wiper operation), navigation information and controls, and internet information.

The augmented reality system further includes a sensing device 16. The sensing device may include, but is not limited to an imaging device such as a camera, infrared camera, or 3-D sensing device. The sensing device 16 captures images within the reference frame 14 for locating the spectacles 12 therein. The sensing device 16 may be part of an existing device that is already utilized in the vehicle for sensing operations such as driver head tracking. Capturing images within the vehicle allows the processing unit 10 to spatially locate and localize the spectacles 12 within the reference frame 14 of the captured image. By localizing the spectacles 12 within the reference frame 14 of the captured image, virtual displays and virtual controls may be positionally overlayed with the real external objects at the desired locations within the captured image for the drivers use. Moreover, virtual displays may be positionally displayed outside of the captured image with the assistance of a global positioning system (e.g., navigation directions/symbols overlayed on the streets of the navigation route).

The spectacles 12 include markings strategically placed on the spectacles 12 that are visible to the sensing device 14 under infrared light for example. The markings may include dots of paint displaced from one another on the frame of the spectacles. The markings on the spectacles 12 are preferably disposed at each temple (e.g., corner) of the frame and on the bridge. It should be understood that the markings are not limited to the locations as described herein, but may be located at other positions on the spectacles. This allows the processing unit 10 to not only identify and localize the position of the spectacles 12 within the reference frame 14 captured image, but to determine the orientation that the spectacles 12 are facing.

The vehicle further includes a vehicle navigation system 18. The navigation system 18 provides a global position of the vehicle. The navigation system 18 may include a GPS or other type of navigation device. The processing unit 10 can utilize the global positioning of the vehicle and the localization of the spectacles 12 within the reference frame 14 captured image of the vehicle for determining the position of the spectacles 12 relative to objects and locations outside of the captured image (e.g., exterior of the vehicle). This allows the augmented reality system to not only generate virtual controls of vehicle applications within the vehicle, but can provide virtual operations with respect to objects and locations exterior of vehicle. For example, navigation symbols may be virtually displayed as it would appear exterior of the vehicle by displaying virtual direction arrows over a street in the distance for providing route directions.

The augmented reality system may also include a secondary detection device 20 worn by the driver and detected by the sensing device 14 and processing unit 10. The secondary detection device 20 may include an accessory, such as a glove or a ring, which is worn by the driver to assist the processing unit 10 in identifying a driver's hand for actuating virtual commands.

The spectacles 12 may further include an eye tracker 22. The eye tracker may be integral or separately attached to the spectacles 12. In contrast to the typical head tracking systems captured by an in-vehicle camera which takes into account the driver's head, size, color glasses, contacts, hats, veils, lighting condition, and movements, the eye tracker 22 mounted on the spectacles 12 provide substantially error-free tracking of the driver's eye for driver awareness features.

The processing unit 10 autonomously establishes communication with the spectacles via a wireless or wireline communication such as Bluetooth and authenticates the spectacles 12 for further communication with the processing unit 10. Once the processing unit 10 and spectacles are authenticated with one another, the spectacles 12 can project virtual reality displays and controls for actuation by the driver. The processing unit 10 in cooperation with the sensing device 14 detects the driver's actions for actuating controls requested by the driver via augmented reality actions of the driver. The localization of the spectacles 12 within the reference frame 14 of the captured image provides the basis for generating the augmented reality environment and executing the commands of the driver within augmented reality environment. Knowing the exact location of the spectacles 12 and their orientation allows the processing system to know what displays and controls the driver is intending to enable, view, and actuate at precise locations. The augmented reality system can overlay the virtual environment utilizing various techniques. The first technique would be that the processing unit of the vehicle processes the position and orientation of the spectacles and based on the desired overlay location in real world sends a video signal to spectacles in which the overlay is in the desired place. A second technique would be that processing unit of the vehicle processes the position and orientation of the spectacles and then transmits to the spectacles the position and orientation data and the desired overlay coordinates. A processing unit of the spectacles then generates the virtual overlay in the desired location.

It should be understood that other applications may be utilized in cooperation with the spectacles. For example, smartphone applications and personal digital assistants may be utilized in cooperation with the augmented reality system. The application software can be downloaded by the processing unit and spectacles for executing the smartphone applications. Other types of applications may be in addition to smartphone applications/personal digital assistant applications.

Figure 2:
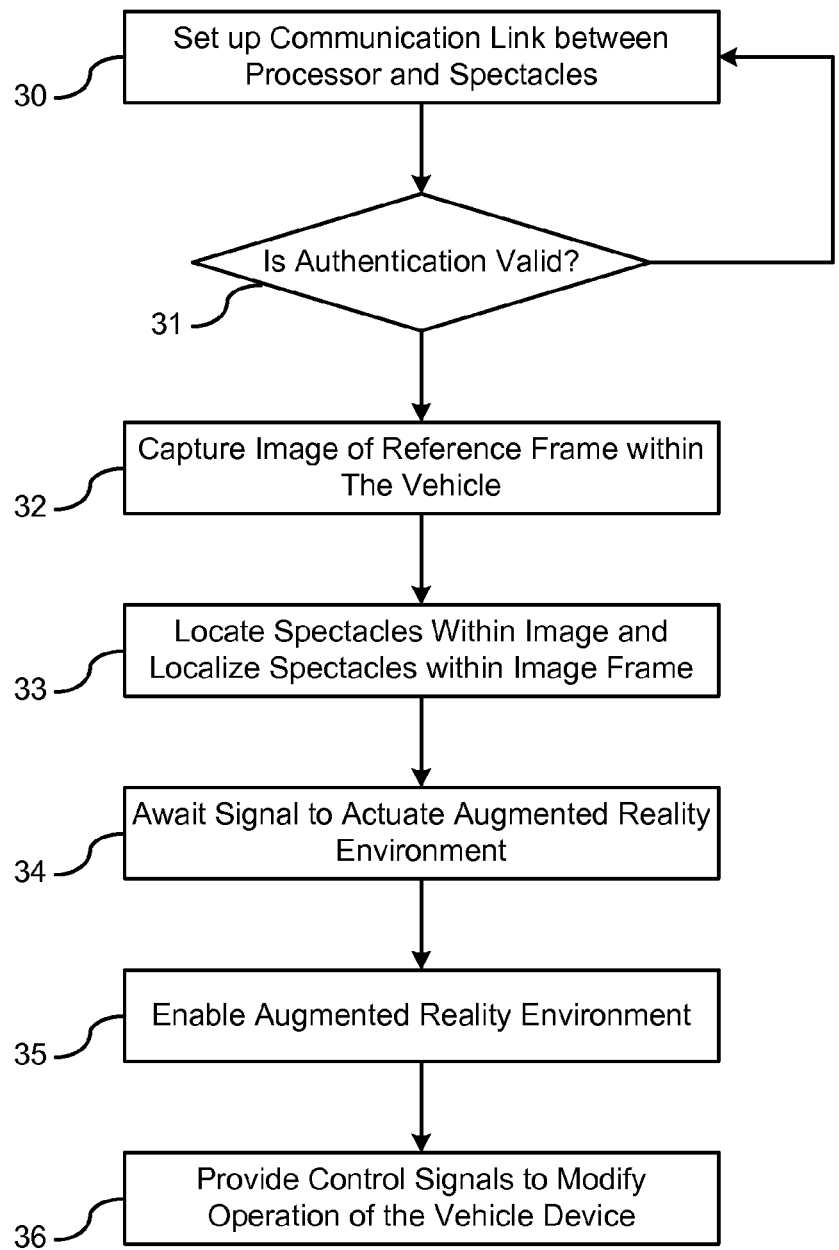
FIG. 2 is a flowchart of a method for enabling an augmented reality environment.

FIG. 2 illustrates a flowchart of a method for enabling an augmented reality environment.

In block 30, the processing unit communicates with the spectacles for setting up a wireless communication link. The wireless communication may include Bluetooth or other similar mode of communication between the devices.

In block 31, a determination is made whether authentication is validated. If authentication fails, the routine returns to step 30. If the authentication passes, then the routine proceeds to step 32.

In block 32, the sensing device captures an image of the reference frame within the vehicle. The sensing device is preferably an infrared camera, however, other types of sensing devices may be utilized that are able to capture the images within the reference frame.

In block 33, the spectacles are located within the image and the spectacles are localized within the reference frame of the captured image. The spectacles preferably utilize at least three markings of paint (e.g., dots) that are visible in an operating spectrum of the system (e.g., infrared range). The at least three markings of paint are preferably spaced apart in order to make sure that the markings are always observable for determining the position and orientation of the spectacles within the reference frame of the captured image. Preferably, the markings are spread across the spectacles in order to achieve a widest baseline as possible.

In step 34, the processing unit and spectacles await a signal from the personnel wearing the spectacles (e.g., driver) to actuate the augmented reality environment. This may be any type of prompt when the driver enters the vehicle. The prompt may be a passive actuation, where the driver is prompted by the augmented reality system whether the driver desires to enable the system, or the driver may actively actuate the environment at the driver's own initiative. Once the driver indicates its intention to enable the augmented reality environment, the routine proceeds to step 35.

In step 35, the augmented reality environment is enabled. Enabling the augmented reality environment also includes a dimming or turning off the displays that are typically visible to the occupants of the vehicle without spectacles so that a virtual display may be displayed. The purpose of dimming or turning off the typical displays is to provide a clean background for the virtual displays so that such virtual displays can be easily seen by the driver without interference. It should be understood that the gauges and information typically displayed on the instrument panel to the driver may be visually maintained in conjunction with the virtual displays if the driver so desires as the virtual displays may be constantly visible through the spectacle or can be selectively displayed upon a command by the driver.

Speed information and other vehicle operating data may be constantly displayed to the driver whereas other information or controls may be made visible upon a command by the driver. The information may appear when the driver looks at a respective portion of the vehicle cluster. This can be performed by monitoring the position and orientation of the spectacles. Moreover, if an eye tracker is utilized, then virtual information is generated over a select region of the instrument panel when the eye tracker system determines that the driver's eye is gazing at the respective region of the instrument panel. Virtual displays may also be generated when the user enables a display through a user action. For example, vehicle accessory controls such as HVAC controls will be made visible upon a driver interacting with a respective region of the reference frame captured by the sensing device. This can be accomplished by the driver extending their hand in front of a heating duct. Upon the sensing device identifying the driver's hand in front of the heating duct, the processing unit and spectacles will cooperatively work to generate a virtual image of HVAC controls. The virtual image of the HVAC controls may be displayed in front of the heating duct or may be displayed in the view of the windshield (e.g., similar to a heads up display) so that the driver can change the control settings while still viewing the path of travel. The spectacles, sensing device, and processing unit will cooperatively work to monitor the user's actions in modifying the virtual controls upon the actions of the user. To assist in identifying the user's hand or finger in making the selection, the secondary detection device such as a glove, ring, or other accessory, may be worn by the user that enables the augmented reality system to better locate the user's hand and identify the selections made by the user. It should be understood that the HVAC controls are only one example of the vehicle functions that may be monitored and controlled in the augmented reality environment.

In step 36, the control signals are provided by the processing unit to either vehicle devices or to control units controlling the vehicle devices for modifying the operation of the vehicle device.

Various display information can also be displayed by the augmented reality system. For example, the system can be utilized for navigation instructions. Given the location of the vehicle as determined by the navigation device and the location of the spectacles within the reference frame of the vehicle, virtual displays may be applied outside of the vehicle. That is, arrows may appear to be overlaid outside of the vehicle suspended in air over the road for identifying the navigation route to the user. Since the location of the spectacles are known relative to the outside environment, a virtual direction marking (e.g., arrow) may be displayed forward of the vehicle where the driver is directed to turn. The virtual direction marking will maintain its position and orientation suspended in air over the respective street despite the vehicle approaching the location to turn. This can be performed since the exact location of the spectacles is known relative to the surrounding environment.

The augmented reality system may also utilize separate video feed to each eye of the spectacle. This provides the spectacle with the capability of projecting images to infinity using the separate video feed to each eye.

While certain embodiments of the present invention have been described in detail, those familiar with the art to which this invention relates will recognize various alternative designs and embodiments for practicing the invention as defined by the following claims.

What is claimed is:

1. An augmented reality system comprising:
    a vision output device for displaying virtual images, the virtual images including virtually displayed information and virtual controls associated with controllable devices;
    a sensing device capturing an image within a reference frame, the vision output device being captured within the image; and
    at least one processor in communication with the sensing device, the processor obtaining the captured image from the sensing device, the processor identifying the vision output device within the reference frame of the captured image, the processor localizing the vision output device within the reference frame of the captured image and identifying an absolute position and orientation of the vision output device within the reference frame of the captured image;
    wherein the vision output device generates virtual displays to a user utilizing the vision output device at respective locations based on the absolute position and orientation of the vision output device within reference frame of the captured image, wherein the sensing device captures a user's selection of a virtual control within the captured image, wherein the processor identifies the user's selection of the virtual control within the captured image and enables a control action of a controllable device associated with the selected virtual control.

2. The system of claim 1 wherein the vision output device includes spectacles.

3. The system of claim 2 wherein markings are placed on the spectacles for enabling the processor to identify a position and orientation of the spectacles within the reference frame of the captured image.

4. The system of claim 3 wherein the sensing device includes an infrared camera, wherein the markings are only visible in an infrared spectrum.

5. The system of claim 3 wherein the spectacles include a frame having a first lens holder, a second lens holder, and a bridge, wherein the markings include three markings, and wherein a first marking is located on the first lens holder, a second marking is located on the second lens holder, and a third marking is located on the bridge.

6. The system of claim 3 wherein spectacles include an eye tracker.

7. The system of claim 1 wherein the processor includes a receiver and transmitter, wherein the vision output device includes a receiver and transmitter, and wherein the processing unit and the vision output device communicate through a wireless communication.

8. The system of claim 7 further comprising a secondary detection device worn on a hand of the user when selecting the virtual control, wherein the processor identifies the secondary detection device on the hand of the user, and wherein the identified secondary detection device assists the processor in determining the respective virtual control selected by the user.

9. The system of claim 1 further comprising a global positioning system for determining a position of the vision output device relative to locations outside of the captured image, wherein the vision output device displays virtual images outside of the captured image relative to the vision output device within the reference frame of the captured image.

10. The system of claim 9 wherein the spectacles display a navigation route, wherein the navigation route is virtually displayed outside of the captured image.

11. A method of displaying augmented reality images relative to a reference frame of a captured image, the method comprising the steps of:
an image capture device capturing an image of a vision output device within the reference frame of the captured image;
at least one processor detecting absolute position and orientation of the vision output device within the reference frame of the captured image;
the vision output device generating virtual displays to a user of the vision output device at respective locations based on the absolute position and orientation of the vision output device within the reference frame of the captured image, the virtual displays including information and virtual controls associated with controllable devices;
wherein the image capture device captures a user's selection of a virtual control, wherein the processing unit identifies the selection of the virtual control and enables a control action for a controllable device associated with the selected virtual control.

12. The method of claim 11 wherein the vision output device includes spectacles, wherein markings are placed on the vision output device for enabling the processor to identify the absolute position and orientation of the spectacles within the reference frame of the captured image.

13. The method of claim 12 wherein the image capture device includes an infrared camera, wherein the infrared camera identifies the position and orientation of the spectacles, and wherein markings are only visible in an infrared spectrum.

14. The method of claim 11 wherein the vision output device and the processor communicates through a wireless communication.

15. The method of claim 11 wherein a global positioning system is used to determine a position of the vision output device relative to locations outside of the captured image, and wherein the vision output device displays virtual images outside of the capture image relative to the vision output device within the reference frame of the captured image.

16. The method of claim 11 wherein virtual heating, ventilation, and cooling displays are generated by the vision output device.

17. The method of claim 11 wherein the vision output device generates virtual entertainment displays.

18. The method of claim 11 wherein the vision output device generates virtual navigation displays.

19. The method of claim 18 wherein the navigation displays generated by the vision output device are virtually displayed outside of the captured image.

20. The method of claim 11 wherein a secondary detection device is worn on a hand of the user when selecting the virtual control, wherein the processor identifies the secondary detection device on the hand of the user, and wherein the identified secondary detection device assists the processor in determining the respective virtual control selected by the user.

* * * * *